(12) United States Patent
Xiao et al.

(10) Patent No.: US 9,843,394 B2
(45) Date of Patent: Dec. 12, 2017

(54) OPTICAL TRANSCEIVER MODULE HAVING UNIBODY STRUCTURE

(71) Applicant: Alliance Fiber Optic Products, Inc., Sunnyvale, CA (US)

(72) Inventors: Qijun Xiao, Fremont, CA (US); Dong Gui, Santa Clara, CA (US); Andy Fenglei Zhou, Fremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 38 days.

(21) Appl. No.: 14/756,729

(22) Filed: Oct. 5, 2015

(65) Prior Publication Data

US 2016/0365928 A1     Dec. 15, 2016

Related U.S. Application Data

(60) Provisional application No. 62/071,858, filed on Oct. 6, 2014.

(51) Int. Cl.

| | | |
|---|---|---|
| *H04J 14/02* | (2006.01) | |
| *H04B 10/40* | (2013.01) | |
| *G02B 6/42* | (2006.01) | |
| *G02B 6/12* | (2006.01) | |
| *G02B 6/293* | (2006.01) | |
| *G02B 6/38* | (2006.01) | |

(52) U.S. Cl.
CPC ......... *H04B 10/40* (2013.01); *G02B 6/12007* (2013.01); *G02B 6/2938* (2013.01); *G02B 6/29362* (2013.01); *G02B 6/29365* (2013.01); *G02B 6/4214* (2013.01); *H04J 14/0209* (2013.01); *G02B 6/3853* (2013.01); *G02B 6/3874* (2013.01); *G02B 2006/12164* (2013.01)

(58) Field of Classification Search
CPC .................................................. H04J 14/0209
See application file for complete search history.

(56) References Cited

U.S. PATENT DOCUMENTS

| | | | |
|---|---|---|---|
| 5,613,031 | A | 3/1997 | Tanabe et al. |
| 5,841,919 | A | 11/1998 | Akiba et al. |
| 6,112,005 | A | 8/2000 | Liu et al. |
| 6,246,812 | B1 | 6/2001 | Liu et al. |
| 6,396,980 | B1 | 5/2002 | Liu et al. |
| 6,400,862 | B1 | 6/2002 | Liu et al. |
| 6,498,876 | B1 | 12/2002 | Liu et al. |
| 6,532,325 | B2 | 3/2003 | Liu et al. |
| 6,535,668 | B2 | 3/2003 | Liu et al. |
| 6,546,166 | B1 | 4/2003 | Liu et al. |
| 6,561,701 | B1 | 5/2003 | Liu et al. |
| 6,674,143 | B2 | 1/2004 | Tatoh et al. |

(Continued)

OTHER PUBLICATIONS

U.S. Appl. No. 13/999,431, filed Feb. 25, 2014.

(Continued)

*Primary Examiner* — Nathan Curs

(74) *Attorney, Agent, or Firm* — Robert L. Branham

(57) ABSTRACT

An optical transceiver module having unibody structure is disclosed. The unibody structure comprises a single-piece substrate, an optical interface, and an optical engine. The components of the optical interface and the components of the optical engine are directly attached to the single-piece substrate.

21 Claims, 8 Drawing Sheets

(56) References Cited

U.S. PATENT DOCUMENTS

| | | |
|---|---|---|
| 6,678,459 B1 | 1/2004 | Wang et al. |
| 6,731,841 B1 | 5/2004 | Shirk |
| 6,748,133 B2 | 6/2004 | Liu et al. |
| 6,791,753 B1 | 9/2004 | Liu et al. |
| 6,792,183 B1 | 9/2004 | Liu et al. |
| 6,894,846 B1 | 5/2005 | He et al. |
| 7,013,069 B1 | 3/2006 | He et al. |
| 7,103,246 B1 | 9/2006 | Zhu et al. |
| 7,212,343 B1 | 5/2007 | He et al. |
| 7,223,026 B1 | 5/2007 | He et al. |
| 7,224,865 B1 | 5/2007 | Wang et al. |
| 7,289,733 B1 | 10/2007 | He |
| 7,412,124 B1 | 8/2008 | He |
| 7,486,891 B1 | 2/2009 | Yao et al. |
| 7,672,554 B1 | 3/2010 | Wang et al. |
| 7,843,644 B1 | 11/2010 | Wang et al. |
| 7,912,374 B1 | 3/2011 | Wang et al. |
| 8,351,791 B1 | 1/2013 | Wang et al. |
| 8,488,244 B1 | 7/2013 | Li et al. |
| 8,530,818 B2 | 9/2013 | Heck et al. |
| 8,537,468 B1 | 9/2013 | Wang et al. |
| 8,873,909 B1 | 10/2014 | Wang et al. |
| 8,879,918 B1 | 11/2014 | Wang et al. |
| 9,219,549 B2 | 12/2015 | Gui et al. |
| 9,401,773 B1 | 7/2016 | Gui et al. |
| 2002/0064191 A1* | 5/2002 | Capewell ............ G02B 6/29367 372/14 |
| 2003/0198025 A1* | 10/2003 | Cao ....................... G02B 6/3897 361/728 |
| 2005/0135756 A1* | 6/2005 | Zhang ................. G02B 6/4277 385/92 |
| 2015/0304053 A1* | 10/2015 | Pfnuer ................... G02B 6/428 398/212 |

OTHER PUBLICATIONS

U.S. Appl. No. 14/332,387, filed Jul. 6, 2014.
U.S. Appl. No. 14/545,271, filed Apr. 15, 2015.
U.S. Appl. No. 14/644,173, filed Mar. 10, 2015.
U.S. Appl. No. 14/884,729, filed Oct. 15, 2015.

* cited by examiner

OPTICAL TRANSCEIVER MODULE HAVING UNIBODY STRUCTURE

CROSS-REFERENCE TO RELATED APPLICATIONS

This application claims the benefit to U.S. Provisional Application No. 62/071,858, filed Oct. 6, 2014.

FIELD OF THE INVENTION

This invention relates to optical transceiver modules, and more specifically relates to optical transceiver modules having unibody structures.

BACKGROUND OF THE INVENTION

The world is experiencing information explosion revolution, driven by multi-media streaming, cloud computing, big data, and artificial intelligence. Internet traffic is increased by 30% per year. Metro and access networking market is the strongest demanding field for higher density of optical ports and higher data exchanging rate. The industry are migrating from optical mux/demux module previous standard CFP form factor to much smaller form factors, e.g., CFP4 and QSFP28.

The existing optical transceiver module designs commonly comprise three elements: optical interface, optical engine, and package. The optical interface is an optical input/output device to connect to the external network. One may use a fiber to route the signal to the external connection. One may also use a pluggable receptacle to accept an external optical connector.

The optical engine is the main component of an optical transceiver module. It may be a mux/demux module. It comprises one or more of the following: a free-space-optics assembly, a planar light-guide circuit, a semiconductor photonics circuit, light emitting and/or light reception units, and light amplitude, phase, mode, and/or polarization manipulating devices.

The package is the housing for the optical interface and the optical engine. The optical interface is attached to the package. The optical engine is also attached to the package. However, the optical interface and the optical engine are separate units. They are built separately. The finished optical interface and optical engine are then attached to the package. Any substantial impact to the package may affect the coupling alignment between the optical interface and the optical engine.

Accordingly, there is a need for optical transceiver modules having robust alignment with higher resistant to package deterioration for better reliability. These transceiver modules should also have small form factor and low manufacturing cost.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
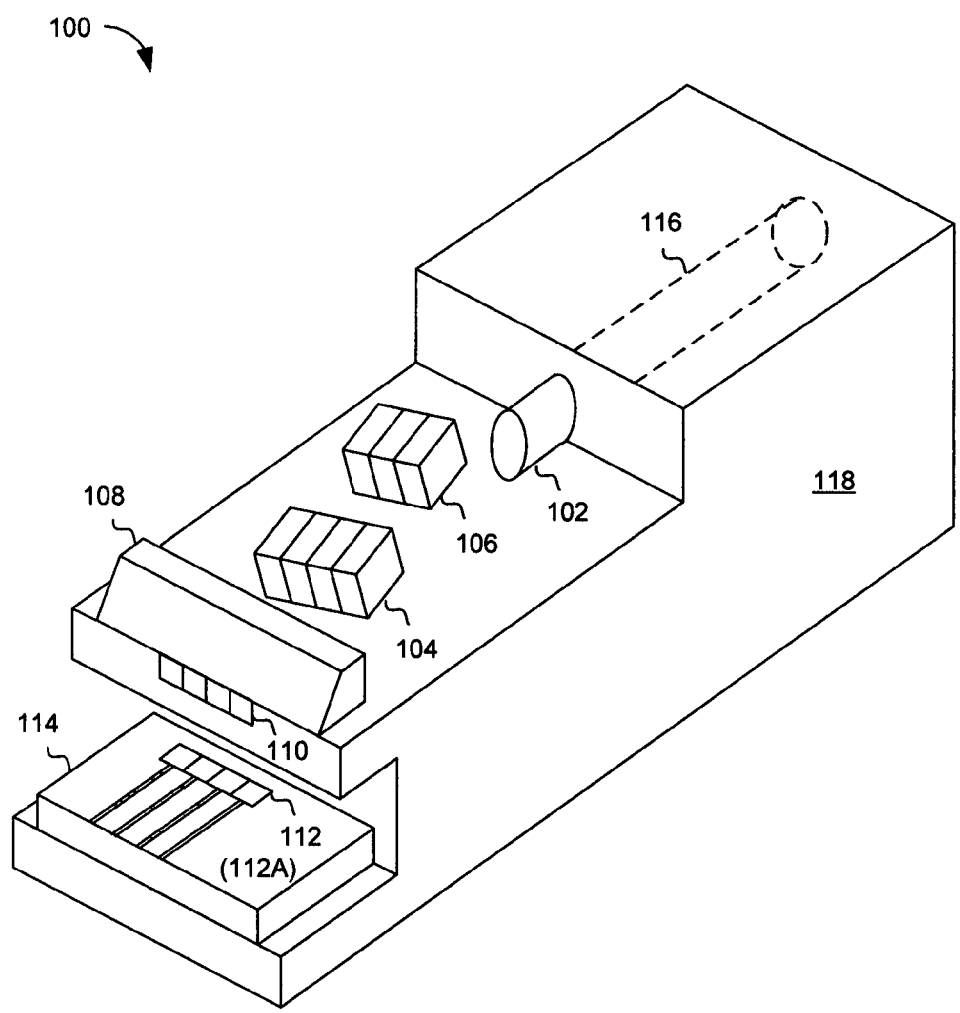
FIG. 1 schematically shows a perspective view of an exemplary unibody structure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

An optical transceiver module is disclosed, it has smaller form factor and robust coupling alignment between the optical interface and the optical engine. The optical transceiver module comprises an optical interface and an optical engine, which are integrated using a single-piece substrate. This simplifies the whole optical module manufacturing by aligning the components of the module one by one from beginning to end in the package. This will also reduce reliability impact from potential deterioration of the package. Conventionally, the optical interface and the optical engine are separate units. They are built separately. The finished optical interface and optical engine are then attached to the package.

The optical interface includes, but not limited to, industry standard optical receptacles having form factors LC, SC, FC, MPO and other customized optical interface structures. The optical engine includes, but not limited to, a free-space mux/demux assembly disclosed in U.S. Pat. No. 8,537,468, which is incorporated herein by reference, and other mux/demux modules comprising PLC, Si photonics, light emitting and light reception units (i.e., lasers and detectors), and light amplitude, phase, mode, and/or polarization manipulating components.

To illustrate the invention, an exemplary optical transceiver module comprises a LC receptacle as an optical interface and a free-space mux/demux assembly as an optical engine. It is appreciated that the example shown is not intended to limit the scope of the present invention. For example, the optical interface may comprise a fiber collimator with a fiber or a receptacle having SC, FC, and MPO form factors. The optical engine may be a mux/demux module comprising a planar light-guide circuit, a semiconductor photonics circuit, light emitting and/or light reception units, and light amplitude, phase, mode, and/or polarization manipulating devices.

FIG. 1 schematically shows a perspective view of an exemplary unibody structure 100 integrating a LC receptacle and a free-space mux/demux assembly using a single-piece substrate 118. This device can be used for multiplexing and/or demultiplexing. Unibody structure 100 comprises single-piece substrate 118. A LC receptacle 116 is disposed in substrate 118. A lens 102 is disposed on substrate 118. Light from LC receptacle 116 is collimated by lens 102. An array of dielectric optical thin film filters 104 and an array of mirrors 106 are disposed on substrate 118. Array of dielectric optical thin film filters 104 selectively transmits light and selectively reflects light. Array of mirrors 106 directs light to array of dielectric optical thin film filters 104. It is appreciated that LC receptacle 116 may be replaced by a fiber collimator with a fiber.

Light collimated by lens 102 is directed to a first element of array of dielectric optical thin film filters 104. Light having wavelength $\lambda 1$ is transmitted through the first element of array of dielectric optical thin film filters 104. The rest of incident light is reflected to a first element of array of mirrors 106 by the first element of array of dielectric optical thin film filters 104. Light incident to the first element of array of mirrors 106 is reflected to a second element of array of dielectric optical thin film filters 104. Light having wavelength $\lambda 2$ is transmitted through the second element of array of dielectric optical thin film filters 104. The rest of incident light is reflected to a second element of array of mirror 106 by the second element of array of dielectric optical thin film filters 104. And so on.

A prism 108 is disposed on substrate 118. Light transmitted through array of dielectric optical thin film filters 104 is reflected by prism 108 downward to an array of microlenses 110. Array of microlenses 110 is disposed in substrate 118 underneath prism 108. Light reflected by prism 108 passes through array of microlenses 110 and is focused onto an array of detector 112. Array of detectors 112 is disposed on a small substrate 114. Small substrate 114 is disposed on substrate 118. Optionally, small substrate 114 may be removed and array of detectors 112 is directly disposed on substrate 118. In this manner, each element of array of detectors 112 will detects light having different wavelengths $\lambda 1, \lambda 2, \lambda 3$, respectively, and so on.

Accordingly, unibody structure 100 integrates LC receptacle 116 and a free-space mux/demux assembly comprising lens 102, array of dielectric optical thin film filters 104, array of mirror 106, prism 108, array of lenses 110, and array of detectors 112, using single-piece substrate 118. It is appreciated that the free-space mux/demux assembly may be replaced by a mux/demux module comprising a planar light-guide circuit, a semiconductor photonics circuit, light emitting and/or light reception units, and light amplitude, phase, mode, or polarization manipulating devices.

In another embodiment, array of detectors 112 is replaced by an array of lasers 112A. Each element of array of lasers 112A emits light having different wavelengths $\lambda 1, \lambda 2, \lambda 3$, respectively, and so on. Lights emitted by array of lasers 112A are collimated by array of microlenses 110. The collimated lights are directed by prism 108 towards array of dielectric optical thin film filters 104. A dielectric optical thin film filter selectively transmits light and selectively reflects light. A mirror directs light to a dielectric optical thin film filter. Accordingly, laser lights having different wavelengths $\lambda 1, \lambda 2, \lambda 3$, and so on, are combined. The combined laser lights are focused by lens 102 onto LC receptacle 116.

Accordingly, unibody structure 100 integrates LC receptacle 116 and a free-space mux/demux assembly comprising lens 102, array of dielectric optical thin film filters 104, array of mirror 106, prism 108, array of lenses 110, and array of lasers 112A, using single-piece substrate 118.

Figure 2:
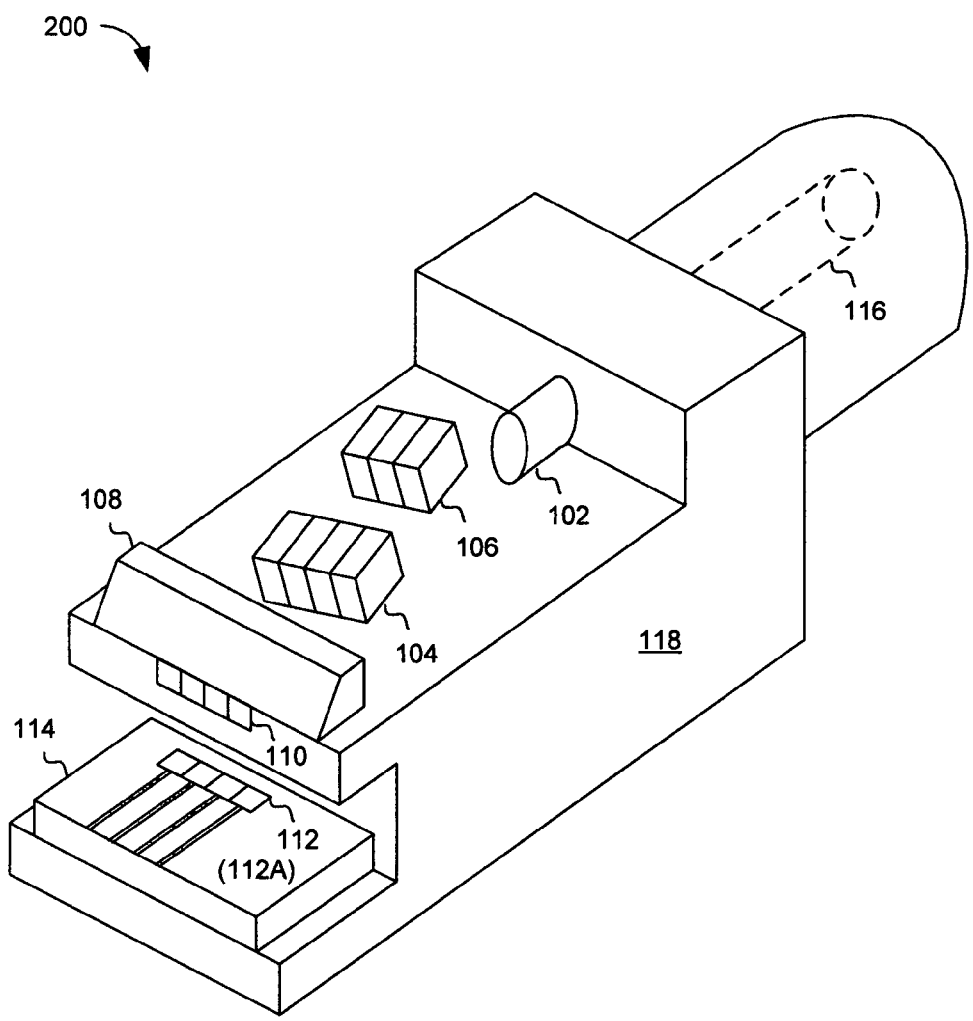
FIG. 2 schematically shows a perspective view of an exemplary unibody structure.

FIG. 2 schematically shows a perspective view of an example of unibody structure 200. Unibody structure 200 is similar to unibody structure 100 of FIG. 1, except a part of single-piece substrate 118 that encloses LC receptacle 116 is shaped to a cylinder for practical and aesthetic reasons.

Figure 3A:
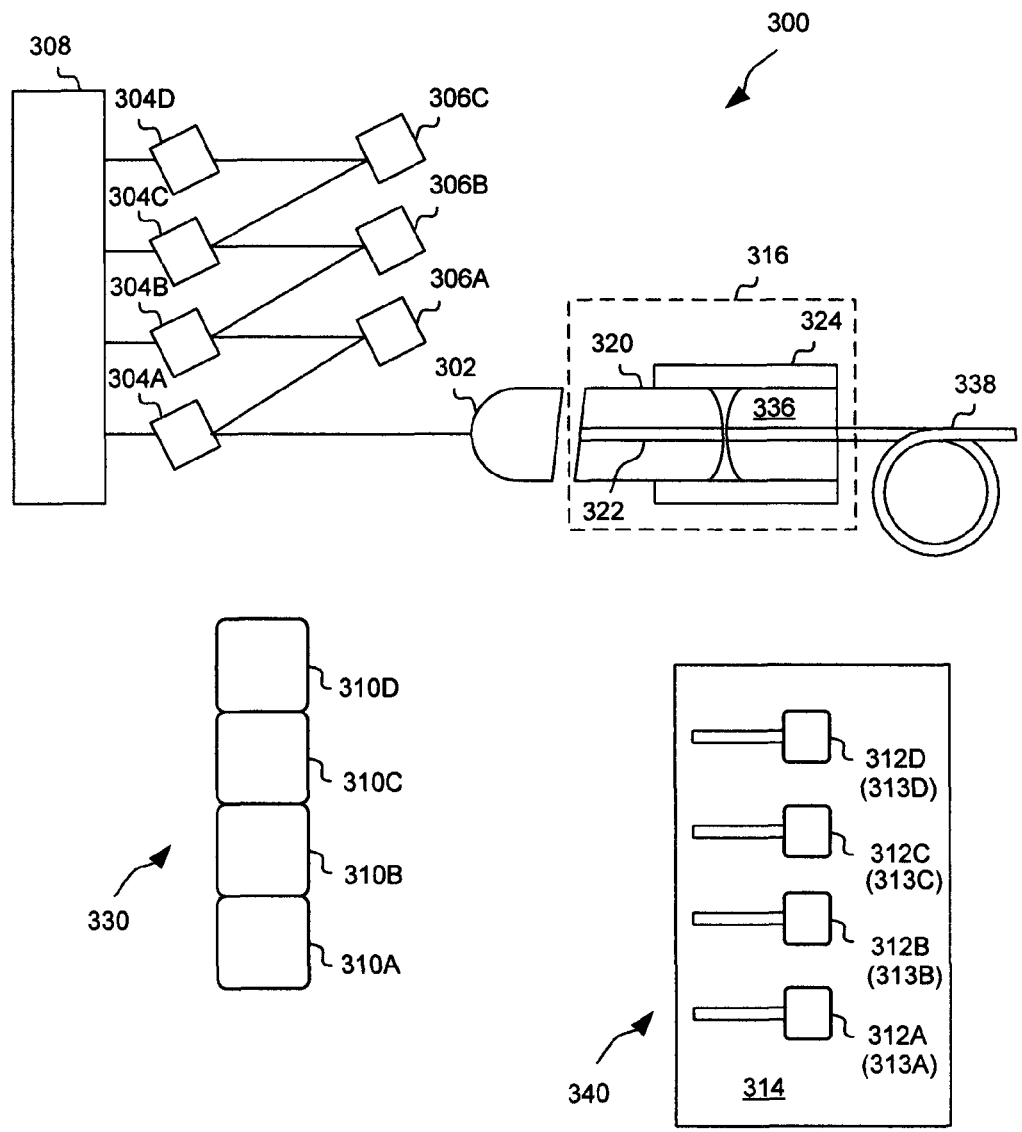
FIG. 3A schematically shows a horizontal cross-sectional view of an exemplary unibody structure comprising a LC receptacle.

FIG. 3A schematically shows a horizontal cross-sectional view of exemplary unibody structure 100 and 200. Layer 300 is an upper layer of substrate 118. Layer 330 is a layer under layer 300 in substrate 118. Layer 340 is a lower layer of substrate 118 (also see FIG. 4 and FIG. 5).

An optical interface, which may be a LC receptacle 316, is disposed on layer 300. LC receptacle 316 comprises a sleeve 324 and a ferrule 320. Sleeve 324 is to accept a ferrule 336 of an input device (not shown). Ferrule 320 couples to ferrule 336. Ferrule 320 comprises a fiber 322. Fiber 322 of ferrule 320 receives light from a fiber 338 included in ferrule 336 of the input device. Light from fiber 322 towards a lens 302 is collimated by lens 302. Lens 302 may be a lens of a fiber collimator. Light from fiber 322 towards lens 302 has a plurality of wavelengths, for example, $\lambda 1, \lambda 2, \lambda 3$, and $\lambda 4$. It is appreciated that more or less than four wavelengths is possible.

Figure 3B:
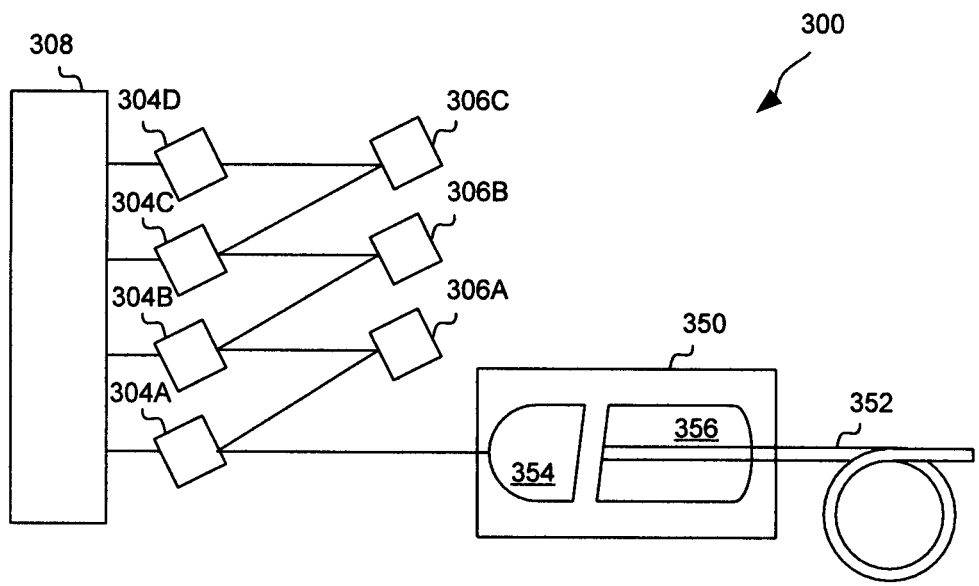
FIG. 3B schematically shows a horizontal cross-sectional view of an exemplary unibody structure comprising a fiber collimator.

FIG. 3B schematically shows a horizontal cross-sectional view of exemplary unibody structure similar to FIG. 3A, except a fiber collimator 350 with a fiber 352 replace lens 302 and LC receptacle 316. Fiber collimator 350 comprises a lens 354 and a ferrule 356 holding fiber 352. In this embodiment, light from fiber 352 towards lens 354 is collimated by lens 354.

Referring back to FIG. 3A, light collimated by lens 302 is directed to a first dielectric optical thin film filter 304A. Light having wavelength $\lambda 1$ is transmitted through first dielectric optical thin film filter 304A. The rest of incident light is reflected to a first mirror 306A by first dielectric optical thin film filter 304A. Light incident to first mirror 306A is reflected to a second dielectric optical thin film filter 304B. Light having wavelength $\lambda 2$ is transmitted through second dielectric optical thin film filter 304B. The rest of incident light is reflected to a second mirror 106B by second dielectric optical thin film filter 304B. A dielectric optical thin film filter selectively transmits light and selectively reflects light. A mirror directs light to a dielectric optical thin film filter.

The process is repeated until first dielectric optical thin film filter 304A transmits light having wavelength $\lambda 1$, second dielectric optical thin film filter 304B transmits light having wavelength $\lambda 2$, third dielectric optical thin film filter 304C transmits light having wavelength $\lambda 3$, and fourth dielectric optical thin film filter 304D transmits light having wavelength $\lambda 4$ towards a prism 308. Prism 308 directs light having wavelengths λ1, λ2, λ3, and λ4 downward to first microlens 310A, second microlens 310B, third microlens 310C, and fourth microlens 310D on layer 330, respectively.

First microlens 310A focuses light having wavelength λ1 onto a first detector 312A. Second microlens 310B focuses light having wavelength λ2 onto a second detector 312B. Third microlens 310C focuses light having wavelength λ3 onto a third detector 312C. Fourth microlens 310D focuses light having wavelength λ4 onto a fourth detector 312D. First detector 312A, second detector 312B, third detector 312C, fourth detector 312D are disposed on a small substrate 314, and small substrate 314 is on layer 340.

As mentioned previously, detectors 312A-312D may be replaced by lasers 313A-313D. Each laser emits light having different wavelengths λ1, λ2, λ3, and λ4, respectively. It is appreciated that more or less than four lasers and more or less than four wavelengths are possible. Light having different wavelengths λ1, λ2, λ3, and λ4 emitted by each laser is collimated by microlenses 310A-310D, respectively. Prism 308 directs light having wavelength λ1 to first dielectric optical thin film filter 304A, light having wavelength λ2 to second dielectric optical thin film filter 304B, light having wavelength λ3 to third dielectric optical thin film filter 304C, light having wavelength λ4 to fourth dielectric optical thin film filter 304D.

Fourth dielectric optical thin film filter 304D transmits light having wavelength λ4 towards third mirror 306C. Third mirror 306C reflects light having wavelength λ4 towards third dielectric optical thin film filter 304C. Third dielectric optical thin film filter 304C transmits light having wavelength λ3 towards second mirror 306B and reflects light having wavelength λ4 towards second mirror 306B. Light having wavelength λ3 and light having wavelength λ4 are now combined becoming a single beam towards second mirror 306B. The process is repeated until all laser lights are combined and focused by lens 302 onto fiber 322 of ferrule 320.

Figure 4:
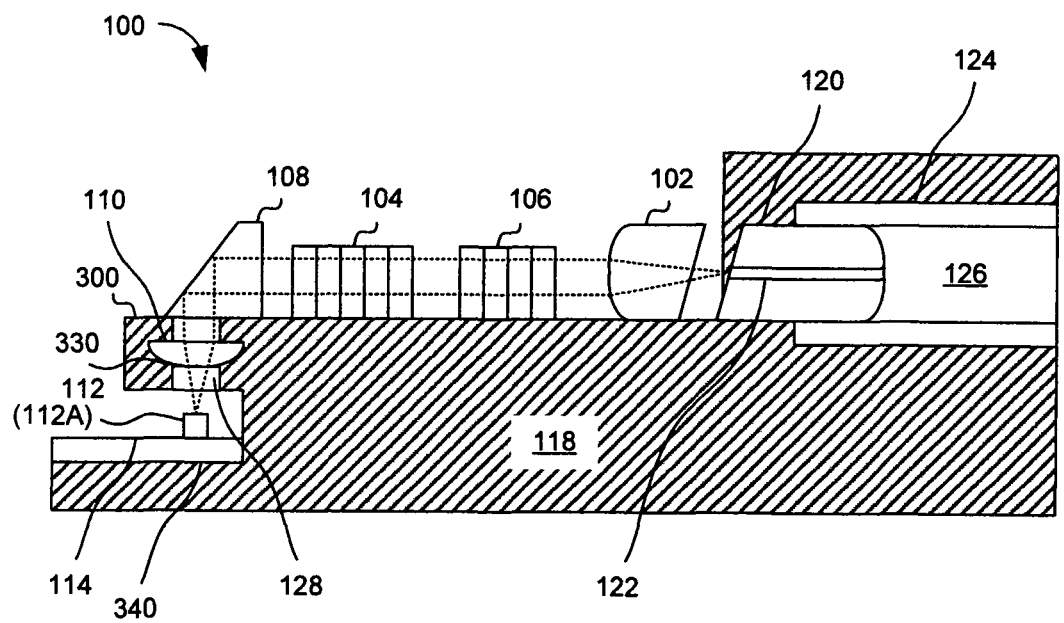
FIG. 4 schematically shows a vertical cross-section view of the exemplary unibody structure of FIG. 1.

FIG. 4 schematically shows a vertical cross-section view of exemplary unibody structure 100 of FIG. 1 integrating a LC receptacle and a free-space mux/demux assembly using single-piece substrate 118. This device can be used for multiplexing and/or demultiplexing. Unibody structure 100 comprises single-piece substrate 118.

An optical interface, which may be a LC receptacle, is disposed in substrate 118. The LC receptacle comprises a sleeve 124 enclosing a cavity 126 and a ferrule 120. Sleeve 124 is to accept the ferrule of an input device (not shown) in cavity 126. Ferrule 120 includes a fiber 122. Fiber 122 of ferrule 120 receives light from the fiber in the ferrule of the input device. Light from fiber 122 towards a lens 102 disposed on substrate 118 is collimated by lens 102. Lens 102 may be a lens of a fiber collimator. Light from fiber 122 towards lens 102 has a plurality of wavelengths, for example, λ1, λ2, λ3, and so on.

An array of dielectric optical thin film filters 104 and an array of mirrors 106 are disposed on substrate 118. Array of dielectric optical thin film filters 104 selectively transmits light and selectively reflects light. Array of mirrors 106 directs light to array of dielectric optical thin film filters 104. Light collimated by lens 102 is directed to a first element of array of dielectric optical thin film filters 104. Light having wavelength λ1 is transmitted through the first element of array of dielectric optical thin film filters 104. The rest of incident light is reflected to a first element of array of mirrors 106 by the first element of array of dielectric optical thin film filters 104. Light incident to the first element of array of mirrors 106 is reflected to a second element of array of dielectric optical thin film filters 104. Light having wavelength λ2 is transmitted through the second element of array of dielectric optical thin film filters 104. The rest of incident light is reflected to a second element of array of mirror 106 by the second element of array of dielectric optical thin film filters 104. And so on.

A prism 108 is disposed on substrate 118. Light transmitted by array of dielectric optical thin film filters 104 is reflected by prism 108 downward to an array of microlenses 110. Array of microlenses 110 is disposed in substrate 118 underneath prism 108. Light reflected by prism 108 passes through array of lenses 110 and is focused onto an array of detector 112. Light coming from prism 108 to array of microlenses 110, and further to array of detectors 112 is in a light path 128 in substrate 118. Light path 128 may be a hole in substrate 118.

Array of detectors 112 is disposed on a small substrate 114. Small substrate 114 is disposed on substrate 118. Optionally, small substrate 114 may be removed and array of detectors 112 is directly disposed on substrate 118. In this manner, each element of array of detectors 112 will detects light having different wavelengths λ1, λ2, λ3, respectively, and so on.

Accordingly, sleeve 124 and ferrule 120 of a LC receptacle, lens 102, array of dielectric optical thin film filters 104, array of mirror 106, prism 108, array of lenses 110, and array of detectors 112 are directly attached to single-piece substrate 118.

As mentioned previously, in an embodiment, a ferrule and a lens of a fiber collimator, array of dielectric optical thin film filters 104, array of mirror 106, prism 108, array of lenses 110, and array of detectors 112 may be directly attached to single-piece substrate 118.

Referring to FIG. 3A, lens 102, array of dielectric optical thin film filters 104, array of mirrors 106, and prism 108 are on layer 300. Array of microlenses 110 are on layer 330. Array of detectors 112 are disposed on small substrate 114, small substrate 114 is on layer 340.

As mentioned previously, array of detectors 112 may be replaced by array of lasers 112A. Each laser emits light having different wavelengths λ1, λ2, λ3, respectively, and so on. Light emitted by lasers will be collimated by array of microlenses 110, and traverses backward until it is focused by lens 102 onto fiber 122 of ferrule 120.

Accordingly, the components of an optical engine, which is a free-space mux/demux assembly and the components of an optical interface, which may be a LC receptacle or a fiber collimator, are directly attached to and secured on single-piece substrate 118. Unlike a conventional optical transceiver module, in which the optical engine is built first on a separate platform and then is coupled to the optical interface, which is also built beforehand on another separate platform, by fixing them to a package, the optical transceiver module having unibody structure 100 shown in FIG. 4 enables direct attachment of the components of the optical engine together with the components of the optical interface to a single-piece substrate in a non-separate process.

Figure 5:
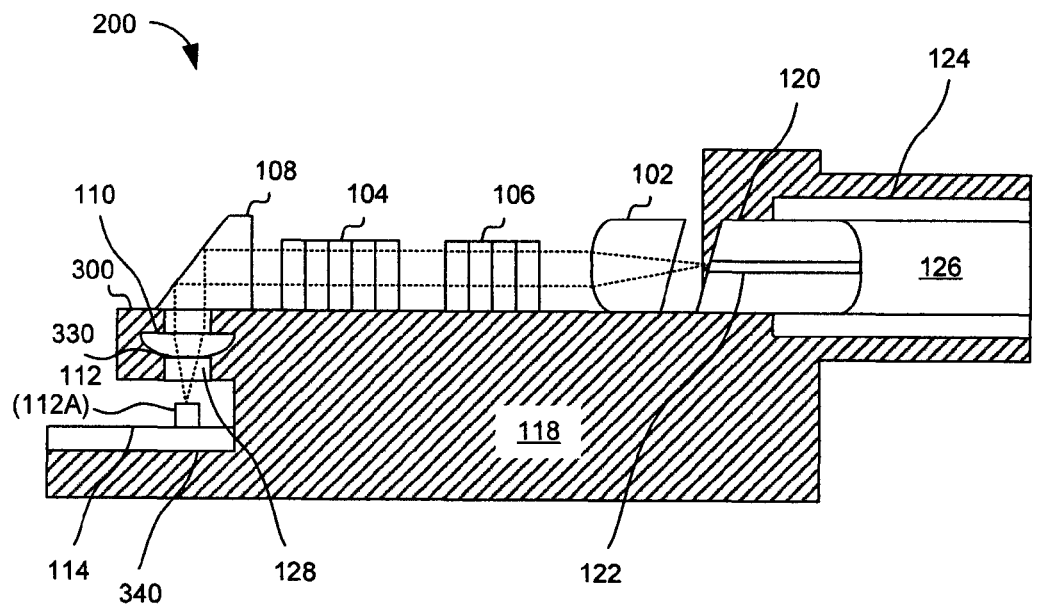
FIG. 5 schematically shows a vertical cross-section view of the exemplary unibody structure of FIG. 2.

FIG. 5 schematically shows a vertical cross-section view of exemplary 200 of FIG. 2 integrating a LC receptacle and a free-space mux/demux assembly using single-piece substrate 118. This device can be used for multiplexing and/or demultiplexing. FIG. 5 is similar to FIG. 4, except a part of single-piece substrate 118 that encloses the LC receptacle is shaped to a cylinder for practical and aesthetic reasons.

Figure 6:
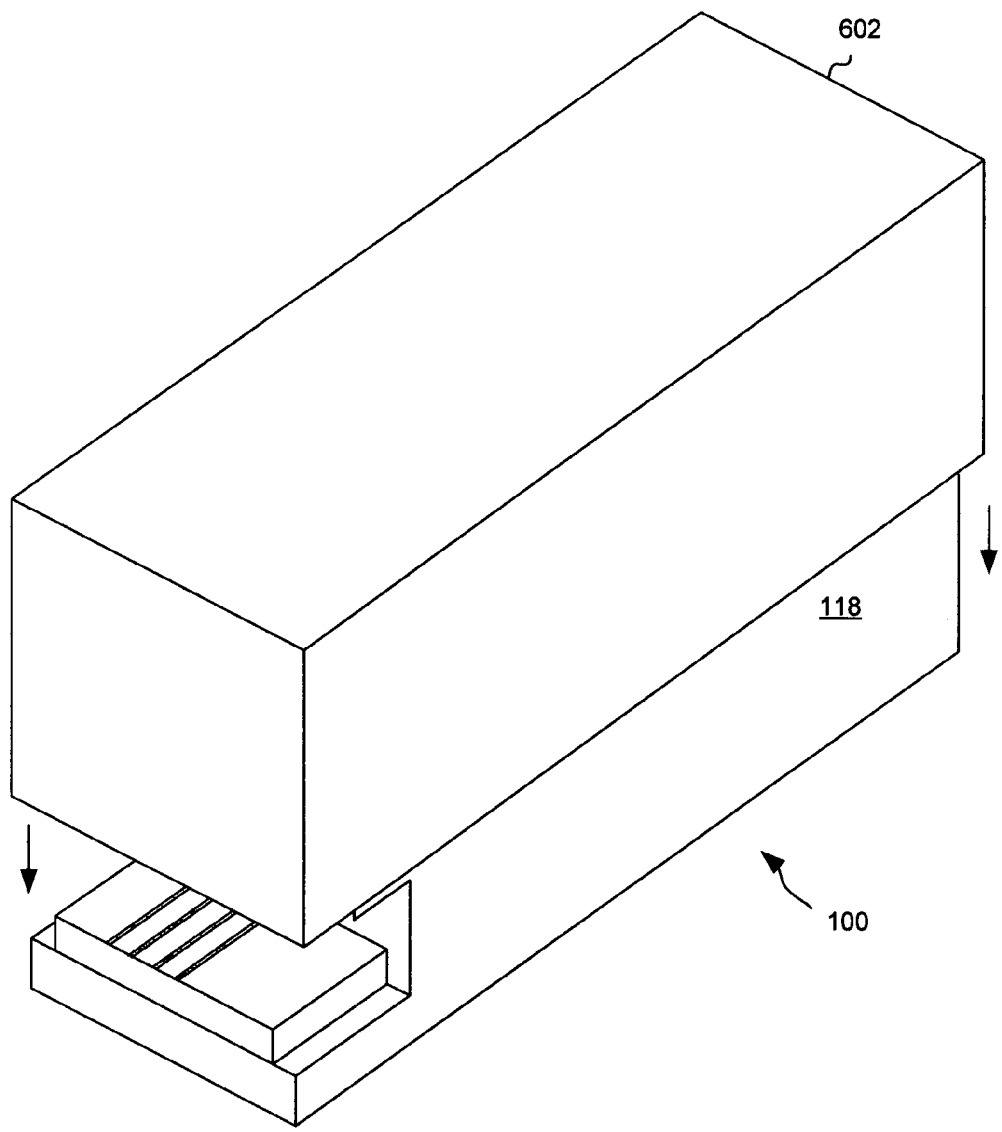
FIG. 6 schematically shows a cover together with a single-piece substrate enclosing the exemplary unibody structure of FIG. 1.

FIG. 6 shows a cover 602 together with single-piece substrate 118 enclose unibody structure 100 of FIG. 1 integrating a LC receptacle and a free-space mux/demux assembly. Cover 602 and single-piece substrate 118 form a package of the optical transceiver module of invention.

Figure 7:
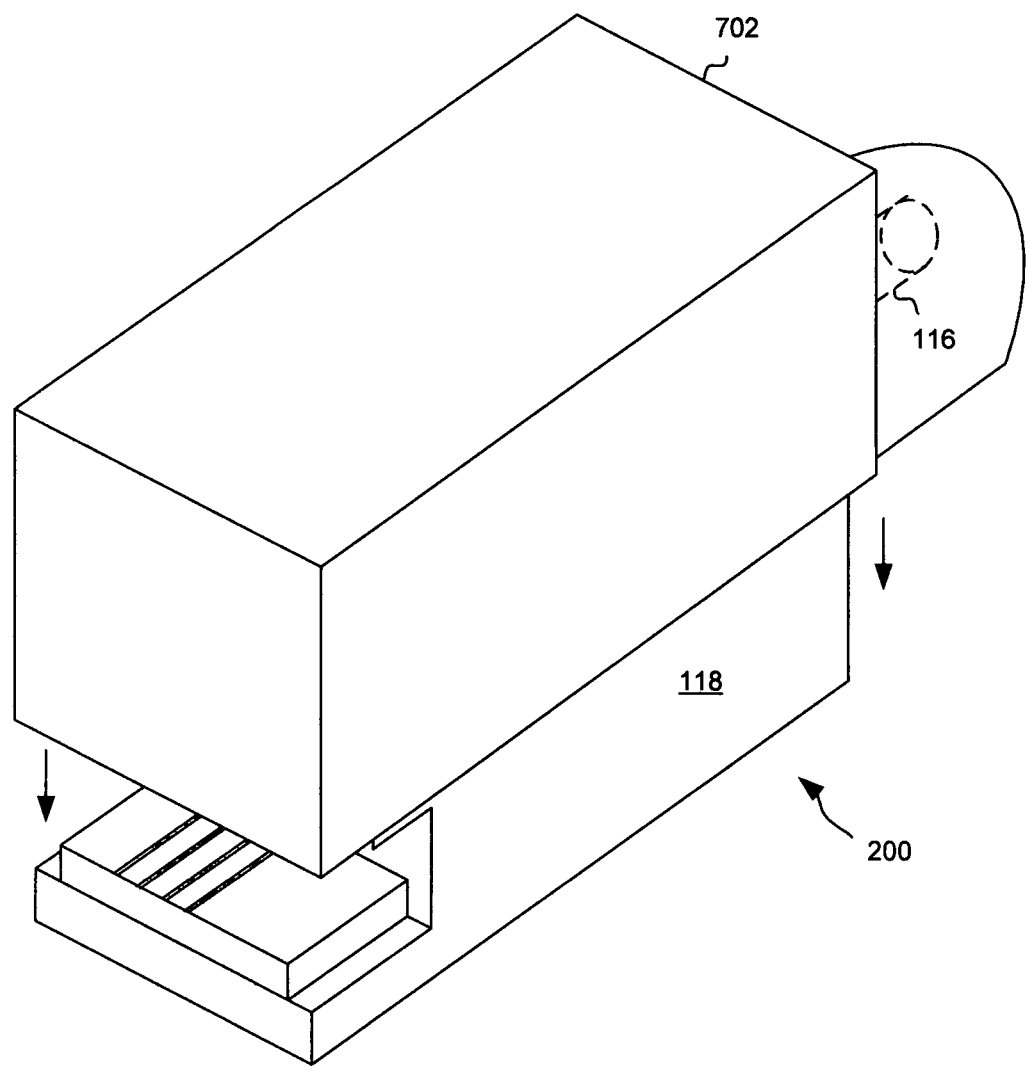
FIG. 7 schematically shows a cover together with a single-piece substrate enclosing the exemplary unibody structure of FIG. 2.

FIG. 7 shows a cover 702 together with single-piece substrate 118 enclose unibody structure 200 of FIG. 2 integrating a LC receptacle and a free-space mux/demux assembly. Cover 702 and single-piece substrate 118 form a package of the optical transceiver module of invention.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An optical transceiver module comprising a unibody structure, wherein the unibody structure comprises:
    a single-piece substrate comprising an optical engine platform and an optoelectronic platform in a stair step configuration, wherein the optical engine platform is offset from the optoelectronic platform by a first rise height and the optical engine platform comprises an overhang extending over a portion of the optoelectronic platform;
    an optical interface fixed by the single-piece substrate for optical propagation of incident light along the optical engine platform; and
    an optical engine; wherein:
        the optical engine is a free-space mux/demux assembly comprising a lens attached to the optical engine platform for collimating the incident light, an array of dielectric optical thin film filters attached to the optical engine platform for selectively transmitting light and selectively reflecting light, and an array of mirrors attached to the optical engine platform for directing light to the array of dielectric optical thin film filters; and
        the free-space mux/demux assembly further comprises an array of detectors attached to the optoelectronic platform below the overhang of the optical engine platform in optical communication with the optical engine or an array of lasers attached to the optoelectronic platform below the overhang of the optical engine platform in optical communication with the optical engine.

2. The optical transceiver module of claim 1, wherein the optical interface is a LC receptacle comprising a sleeve and a ferrule including a fiber.

3. The optical transceiver module of claim 2, wherein the free-space mux/demux assembly further comprises:
    a prism;
    an array of microlenses, wherein the prism directs light from the array of dielectric optical thin film filters to pass the array of microlenses; and
    the array of detectors, wherein light passed by the array of microlenses is focused on the array of detectors.

4. The optical transceiver module of claim 3, wherein:
    the lens, the array of dielectric optical thin film filters, the array of mirrors, and the prism are on the optical engine platform of the single-piece substrate;
    the array of microlenses is in the overhang of the optical engine platform of the single-piece substrate; and
    the array of detectors is on the optoelectronic platform of the single-piece substrate.

5. The optical transceiver module of claim 4, wherein the array of detectors is disposed on a substrate on the optoelectronic platform of the single-piece substrate.

6. The optical transceiver module of claim 1, wherein the optical interface is a fiber collimator comprising a ferrule holding a fiber.

7. The optical transceiver module of claim 6, wherein the free-space mux/demux assembly further comprises:
    a prism;
    an array of microlenses, wherein the prism directs light from the array of dielectric optical thin film filters to pass the array of microlenses; and
    the array of detectors, wherein light passed by the array of microlenses is focused on the array of detectors.

8. The optical transceiver module of claim 7, wherein:
    the array of dielectric optical thin film filters, the array of mirrors, and the prism are on the optical engine platform of the single-piece substrate;
    the array of microlenses is in the overhang of the optical engine platform of the single-piece substrate; and
    the array of detectors is on the optoelectronic platform of the single-piece substrate.

9. The optical transceiver module of claim 8, wherein the array of detectors is disposed on a substrate on the optoelectronic platform of the single-piece substrate.

10. The optical transceiver module of claim 1, wherein the optical interface is one of SC, FC, and MPO receptacle.

11. The optical transceiver module of claim 1, wherein the optical engine is a mux/demux module comprising one of planar light-guide circuit, semiconductor photonics circuit, light emitting unit, light reception unit, light amplitude manipulating device, light phase manipulating device, light mode manipulating device, and light polarization manipulating device.

12. The optical transceiver module of claim 1 further comprising a cover for enclosing the unibody structure.

13. The optical transceiver module of claim 2, wherein the free-space mux/demux assembly further comprises:
    the array of lasers for emitting laser lights;
    an array of microlenses for collimating the emitted laser lights; and
    a prism for directing the collimated laser lights.

14. The optical transceiver module of claim 13, wherein
    the lens, the array of dielectric optical thin film filters, and the array of mirrors, and the prism are on the optical engine platform of the single-piece substrate;
    the array of microlenses is in the overhang of the optical engine platform of the single-piece substrate; and
    the array of lasers is on the optoelectronic platform of the single-piece substrate.

15. The optical transceiver module of claim 14, wherein the array of lasers is disposed on a substrate on the optoelectronic platform of the single-piece substrate.

16. The optical transceiver module of claim 6, wherein the free-space mux/demux assembly further comprises:
    the array of lasers for emitting laser lights;
    an array of microlenses for collimating the emitted laser lights; and
    a prism for directing the collimated laser lights.

17. The optical transceiver module of claim 16, wherein:
   the array of dielectric optical thin film filters, and the array of mirrors, and the prism are on the optical engine platform of the single-piece substrate;
   the array of microlenses is in the overhang of the optical engine platform of the single-piece substrate; and
   the array of lasers is on the optoelectronic platform of the single-piece substrate.

18. The optical transceiver module of claim 17, wherein the array of lasers is disposed on a substrate on the optoelectronic platform of the single-piece substrate.

19. The optical transceiver module of claim 1, wherein the free-space mux/demux assembly further comprises:
   the array of lasers for emitting laser lights;
   an array of microlenses for collimating the emitted laser lights; and
   a prism for directing the collimated laser lights.

20. The optical transceiver module of claim 19, wherein the lens, the array of dielectric optical thin film filters, and the array of mirrors, and the prism are on the optical engine platform of the single-piece substrate, the array of microlenses is in the overhang of the optical engine platform of the single-piece substrate, and the array of lasers is on the optoelectronic platform of the single-piece substrate.

21. The optical transceiver module of claim 1, wherein the stair step configuration of the single-piece substrate further comprises an interface platform offset from the optical engine platform by a second rise height and components of the optical interface are disposed in the interface platform of the single-piece substrate.

* * * * *